UNITED STATES PATENT OFFICE.

FRANZ BRIESEMEISTER, OF NEW YORK, N. Y.

SIZE FOR CALCIMINE.

SPECIFICATION forming part of Letters Patent No. 563,999, dated July 14, 1896.

Application filed February 19, 1896. Serial No. 579,937. (No specimens.)

*To all whom it may concern:*

Be it known that I, FRANZ BRIESEMEISTER, a citizen of the Empire of Germany, residing in the city of New York, county and State of New York, have invented certain new and useful Improvements in Sizes for Calcimine, of which the following is a specification.

This invention relates to an improved composition of matter for size for calcimine by which a certain degree of hardness is imparted to the calcimine when it is applied to the wall, so that it adheres to the walls coated by it in a higher degree without rubbing off; and the invention consists of a composition of matter for size for calcimine, composed of a solution of glue, ammonium chlorid, zinc chlorid, and alum in water, which is prepared in the following manner:

Three pounds of glue are dissolved in water by slowly heating the same, after which three pounds of ammonium chlorid, one pound of zinc chlorid, and one pound of alum are dissolved under continuous stirring until a clear solution is obtained. This solution is dissolved in eleven gallons of water. The size thus obtained is mixed with the calcimine in suitable proportion, so that it can easily be applied to the walls to be coated.

The calcimine dries quickly and assumes a high degree of hardness, resembling to some extent the finishing coat of plaster, the calcimine being not liable to come off by rubbing as ordinary calcimine.

My improved size is cheaper than the calcimine-sizes heretofore in use and produces a better and more durable coating for walls.

Having thus described my invention, I claim as new and desire to secure by Letters Patent—

The herein-described composition of matter for size for calcimine, consisting of a solution of glue, ammonium chlorid, zinc chlorid, and alum in water, substantially as set forth.

In testimony that I claim the foregoing as my invention I have signed my name in presence of two subscribing witnesses.

FRANZ BRIESEMEISTER.

Witnesses:
PAUL GOEPEL,
GEO. W. JAEKEL.